Patented Sept. 1, 1953

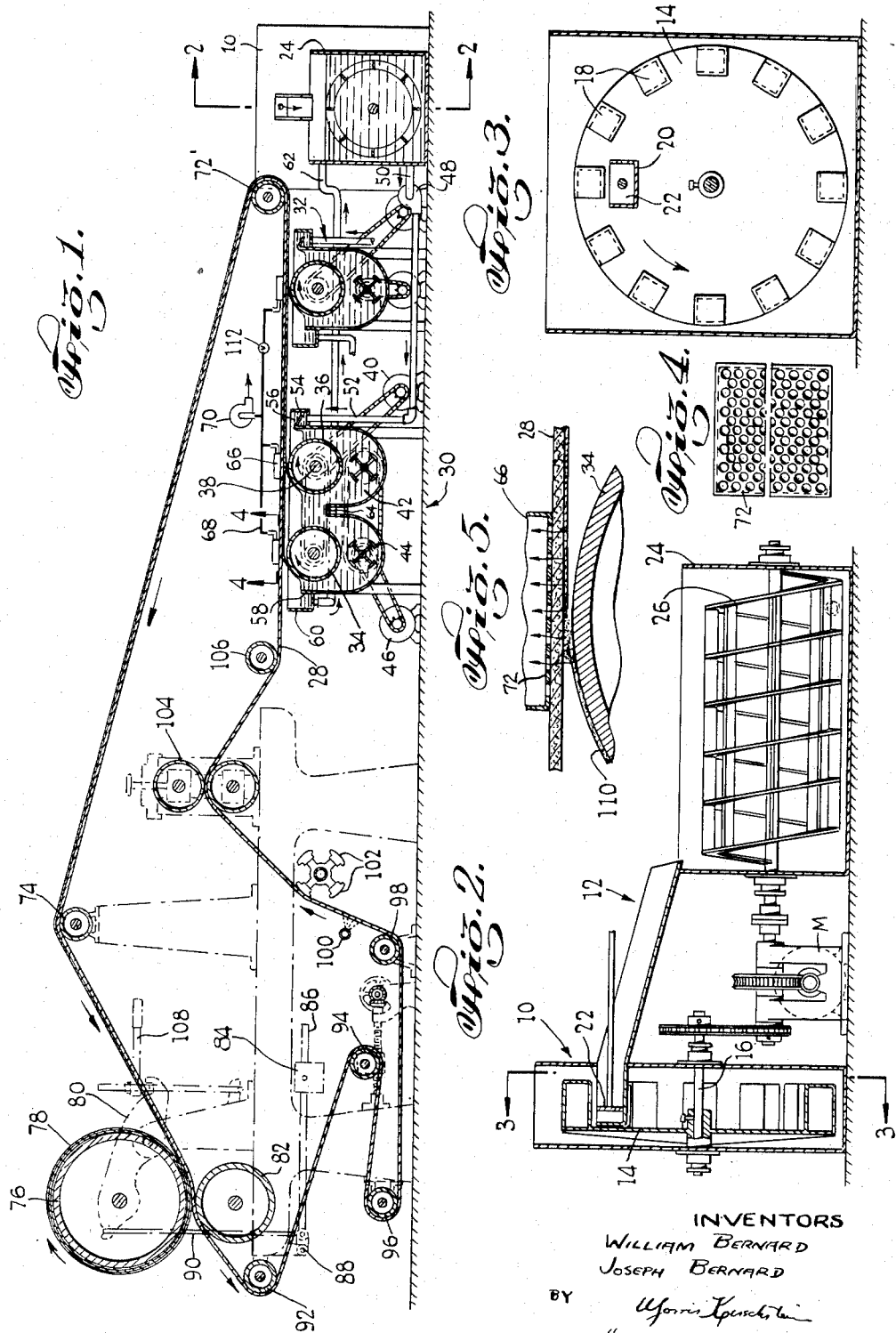

2,650,524

UNITED STATES PATENT OFFICE 2,650,524

APPARATUS FOR MANUFACTURING CEMENT-ASBESTOS BOARD

William Bernard and Joseph Bernard, West Millington, N. J., assignors to American Asbestos Industries, Inc., Berkeley Heights, Township of New Providence, N. J., a corporation of New Jersey Original application June 6, 1946, Serial No. 674,808. Divided and this application August 25, 1949, Serial No. 112,230

5 Claims. (Cl. 92—43)

This invention relates to an apparatus for manufacturing cement-asbestos board such as is used, for example, in the fabrication of cement-asbestos shingles.

At the present time cement-asbestos board is made commercially in a plant including the following parts: a cement-asbestos slurry mixer, a stuff chest, a molding vat, means to transport the cement-asbestos slurry from the mixer to the stuff chest and from the stuff chest to the molding vat, a foraminous molding drum mounted to rotate in the vat with a portion of its surface above the level of the slurry, a felt carrier band which passes above the drum and a couch roller to press the band against the drum. The drum is rotated at a speed matching the linear speed of travel of the band to enable the cement-asbestos film which is raised above the level of the slurry on the upper surface of the drum to be transferred onto the band.

As the film is elevated water drains from the same through the foraminous drum. More water is expressed from the film by the couch roll during transfer to the band. The openings in the drum also allow drainage to take place in the submerged portion of the drum. All the drainage water carries with it some cement and short asbestos fibers, inasmuch as, to permit speedy drainage of the elevated film, the holes in the foraminous drum are of visible size (e. g. the apertures in the screen facing of a conventional molding drum). Such water (actually a very thin slurry) is not wasted but is piped to a standby tank known in the industry as a "Saveall." The thin slurry is allowed to remain quiescent in the tank until it has separated in its component parts, the cement and asbestos gravitating to the bottom as a silt with a column of water standing above it. The cement-asbestos silt then is pumped out of the tank and led back to the mixer along with fresh cement and asbestos.

Slurry is constantly fed from the stuff chest to the molding vat at a rate which approximates the rate of transfer of the slurry onto the band. This is watched by an operator who by varying the rate of feed of the slurry tried to hold constant the level of the slurry in the vat. Quite commonly the slurry is fed too rapidly and the excess runs over the side of the vat onto the floor. This is so common that the floors are provided with drains to lead the excess slurry back to the Saveall.

The cement-asbestos silt accumulates in the Savealls (usually several are employed) at a rate such that at the end of each week the Savealls have to be emptied. In actual practice an enormous quantity of material is taken from the Savealls every week. This material is all thrown away. The amount of material wasted can be appreciated from the fact that it is necessary to use about 111 pounds of sand, cement and asbestos to obtain 100 pounds of asbestos board. This represents a loss of even more than 11 pounds for each 100 pounds of finished board, because the board as shipped may contain anywhere from 10 to 25% of free water in addition to the waters of hydration. It will thus be seen that the industry is presently wasting over 20% of the cement and asbestos.

It is an object of this invention to provide an improved apparatus which prevents such large waste of material.

It is another object of the invention to provide an apparatus of the character described which does not require a Saveall in normal use.

It is a further object of the invention to provide an apparatus of the character described which does without many of the parts used in conventional machines but which, nevertheless, makes a stronger and generally better cement-asbestos board than that now manufactured.

It is an additional object of the invention to provide an apparatus of the character described which is smaller and more inexpensive to make and use than the present day machines.

Other objects of the invention will in part be obvious and in part hereinafter pointed out.

The invention accordingly consists in the features of construction, combinations of elements and arrangement of parts which will be exemplified in the construction hereinafter described and of which the scope of application will be indicated in the appended claims.

In the accompanying drawings in which is shown one of the various possible embodiments of this invention;

Fig. 1 is an elevational view of a cement-asbestos board making plant constructed in accordance with the invention;

Fig. 2 is a sectional view through the stuff chest and agitator tank, the same being taken along the line 2—2 on Fig. 1;

Fig. 3 is a sectional view taken substantially along the line 3—3 of Fig. 2;

Fig. 4 is a fragmentary bottom view of the suction box, the same being taken along the line 4—4 of Fig. 1; and Fig. 5 is an enlarged fragmentary view of the collecting roll at the point of transfer to the carrier band.

In general, the several objects of the invention are achieved by so modifying the existing cement-asbestos board manufacturing plant that no asbestos or cement is carried off with waste water and no slurry is slopped over the sides of the molding vat. This is accomplished by making two major changes in the apparatus, to-wit (a) using an imperforate rather than a foraminous molding drum, and (b) employing a continuous cycle for restoring to the molding vat, before it has time to set, the excess cement-asbestos slurry which has to be fed to the vat to keep the level of the slurry high enough for proper operation. There should also be provided a vacuum means, such as a suction box, over the pervious carrier band where the latter passes above the drum. Said means sucks the cement-asbestos slurry film off the drum and pulls it onto the band, extracting water from the slurry after the transfer.

Referring now to the drawings in which is shown a plant embodying the invention, 10 denotes a conventional stuff chest into which a thin cement-asbestos mixture known as "slurry" is fed from a suitable mixing or batching machine (not shown).

Any suitable means is used to transfer the slurry at a uniform but regulatable rate from the stuff chest to a chute 12. Such means as illustrated herein includes a vertical plate 14 mounted for rotation within the stuff chest on a horizontal shaft 16 turned by a motor M through a suitable driving train. The plate has a number of buckets 18 set around its periphery in such arrangement that as the plate rotates the rising buckets will lift slurry above the level of the slurry in the stuff chest and as the buckets tip the slurry will discharge into a trough 20 extending from the stuff chest to the chute 12. Said trough has a gate 22 slidable therein to control the rate at which slurry is fed to the chute 12. From said chute the slurry discharges into a tank 24 having an agitator 26 driven by the motor M.

The plant as thus far described is entirely conventional and has been mentioned only in order to facilitate understanding of the invention. Pursuant to said invention, the cement-asbestos slurry is applied to a pervious, fibrous, endless carrier band 28 by apparatus contained in molding vats 30, 32. Said apparatus is substantially duplicated in the two vats so that only the construction and operation of the apparatus in the vat 30 will be described in detail. Said vat 30 contains two imperforate cylindrical collecting rolls 34, 36 mounted for rotation about spaced horizontal axes disposed beneath and parallel to the under surface of the carrier band 28. Said rolls transversely span the width of the band and, preferably, their axes of rotation are perpendicular to the direction of band travel. Suitable adjustments (not shown) are included to regulate the height of the rolls in the vat and to independently vary the distance from the upper surfaces of the collecting rolls to the undersurface of the carrier band. Although said rolls may be solid, an appreciable savings in weight will be effected if the same are of hollow tubular section. The external surfaces of the rolls may be smooth or, if it is desired under certain conditions mentioned hereinafter to increase the rate of pick-up, the external surfaces can be roughened, mottled, striated or have any suitable design or configuration. The rolls should be made from a material such as stainless or rust-proofed steel, brass, bronze, copper or aluminum, which will not be affected by any of the constituents of the slurry.

The rolls are supported on shafts 38 which are journalled in and extend beyond the side walls of the vat 30, one shaft carrying a sheave which is belt driven from a variable speed motor 40. The same shaft has a sprocket which turns the shaft of the other roller through a chain.

The vats are constructed to provide a sump 42 beneath each collecting roll, agitator paddles 44 being located in the sumps. These paddles are driven by pulleys and belts from a motor 46.

Slurry is fed into the vat 30 from the tank 24 by a pump 48 whose intake is connected by a conduit 50 to the bottom of the tank 24 and whose outlet is connected by a conduit 52 to the bottom of a stock (slurry) inlet trough 54 mounted on an upper edge of the vat 30. The outer side wall of the trough 54 is slightly higher than the inner side wall of the trough, this latter wall comprising one of the side walls of the vat 30. Such construction provides an overflow feed from the trough 54 to the vat. In order to prevent undue agitation in the trough 54 a deflector plate 56 is disposed over the region where the conduit 52 discharges into the trough 54.

The level of the slurry in the vat is kept constant by an overflow weir constituting a top edge 58 of a side wall of the vat disposed at a level lower than the level at which slurry is discharged from the inlet trough 54 into the vat. Slurry flows over the edge 58 into a stock outlet trough 60 from which it runs under a gravity head through a conduit 62 back to the tank 24. The pump 48 is operated to feed slurry to the vat 30 at a rate faster than that at which slurry is transferred by the collector rolls 36 from said vat to the carrier band 28. Accordingly, slurry continuously overflows from the vat, thus maintaining a constant level of slurry without, however, slopping any slurry over the sides of the vat. It will be observed that this system provides a constant recirculation of the fresh slurry, that is, no slurry is allowed to leave the active field of operation and be transferred to a remote point there to stand for an appreciable time before being used, as was the custom heretofore.

Although two collector rolls are shown side by side in the vat it will be understood that the number of such rolls may be varied at will depending upon the thickness of the cement-asbestos layer to be applied to the carrier band as it passes over the vat 30 and upon the nature of the product being made. It may also be mentioned that where two or more collecting rolls are employed, it is desirable to interpose a baffle or dividing wall 64 between said rolls with the top edge thereof at a lower level than that of the slurry in the vat. This will prevent any general flow throughout the entire vat which might tend to disturb the uniformity of the cement-asbestos mix under any given roll.

A vacuum means such as a suction box 66 is located over the upper part of each collecting roll, said box being disposed immediately above the upper surface of the carrier band. These boxes are connected by conduits 68 to the intake of a suction pump 70. The suction boxes may, as shown, be in the shape of hollow, elongated, inverted troughs whose bottoms are closed by a perforate plate 72 (see Fig. 4).

The vat 32 differs from the vat 30 essentially only that it is fed from a separate source of supply containing a cement-asbestos slurry different from that which is fed to the vat 30. The vat 32, like the vat 30, may have one or more collector rolls and preferably has its own stuff chest and agitator tank. In addition, the vat 32 has its own suction box which like the other suction boxes can be connected to the suction pump 70 inasmuch as the water discharged from said pump runs to waste.

The carrier band, after passing over the collecting rolls, travels to the press section of the plant which is shown at the left-hand side of Fig. 1 and which is largely conventional, being illustrated in order that the invention may be described in conjunction with a complete plant. After it leaves the vats the carrier band passes over an idler roll 72' to reverse the direction of the travel of the band. From here the band rides onto an idler roll 74 and then to a forming roll 76 on which the cement-asbestos layer disposed on the carrier band above the vats is transferred to a laminated tube 78.

Said forming roll is carried by a shaft which is journalled at its opposite ends in pivotally mounted levers 80. The forming roll rests on a bottom press roll 82 to aid in transferring the cement-asbestos layer to said forming roll. The pressure between the forming and press rolls 76 and 82 is controlled by a counterweight 84 slidably mounted on a lever 86 pivoted at the end 88 thereof remote from said weight. This lever is connected intermediate the weight and pivoted end 88 to the lever 80 near the shafts of the forming roll 76 by a link 90.

After leaving the bottom press roll 82 the band passes in succession about an idler 92, a slack take-up roll 94, the driving pulley 96 of a variable speed motor, an idler 98, a water spray 100, a whipper 102, wringing rolls 104 and idler 106, this latter idler guiding the carrier band to the proper horizontal plane.

To set up the machine, assuming the plant to have been thoroughly cleaned after a week-end, cement, sand and asbestos are mixed together in proper proportions in the batcher to form a slurry of suitable consistency. This slurry is fed down to the stuff box and the motor M started. The gate 22 is pushed back to allow a maximum flow and the cement-asbestos slurry is allowed to fill up the agitator tank 24. Thereupon the motor for the pump 48 is started so that slurry will flow into the vat 30. The motor 40 for the collecting rolls 34 and 36 still is idle but the vat agitator motor 46 is started. In a short time the vat will fill and an overflow will start over the weir edge 58 through the conduit 62 back into the agitator tank 24.

During this time the operator adjusts the height of the extreme top portion of the collector roll relative to two parts of the machine. One adjustment is to obtain a certain relationship between the top of the rolls and the level of the slurry. The other adjustment is to space the top of the roll a short distance from the undersurface of the carrier band. These relationships will depend upon the composition of the slurry, the size of the collecting rolls, the rate of rotations of the collecting rolls, the nature of the surface of the collecting rolls and the type of product which is being manufactured. The relationship between these factors will be apparent as the description proceeds. The adjustment of the height of the roll relative to the slurry is made by regulating the vertical position of the shafts of said collecting rolls through the means already mentioned. The regulation of the distance from said rolls to the carrier band preferably is accomplished by adjusting the height of the suction boxes 66 by means (not shown).

The machine is now ready to operate. The motor which energizes the driving pulley 96 is started up and set at a proper speed to obtain the desired rate of travel of the carrier band over the vats 30, 32. A suggested range of band speeds is from 95 to 160 feet per minute, a speed of 140 feet per minute having been found to secure efficient operation. Now the motor 40 is energized to turn the collecting rolls over at a proper speed such that their linear surface speeds are in excess of the speed of the band. This will enable the layer of material deposited at each roll to be thicker than the film picked up from the slurry by said roll. One such layer is deposited by the roll 34 and another layer superimposed upon said first layer by the second roll 36. If additional layers are to be deposited at each pass, additional collecting rolls may be employed.

The deposited cement-asbestos layer travels along with the band to the forming roll 76 at which point the layer is transferred to said roll 76 and wrapped around the same in spiral fashion to form a laminated tube. When the tube is thick enough the lever 80 is rotated in a counterclockwise direction by means of a jack 108. A wire (not shown) lies across the forming roll. This wire is raised to split the laminated tube and form a laminated sheet which is taken off the forming roll and processed in any manner well known to the art. The wire is restored to idle position and the deposited layer on the carrier band will start to make a new tube. After it passes the forming roll 76, the band is washed, whipped and has the water expressed therefrom by the wringers 104 whereupon it is ready to have a fresh layer or layers of cement-asbestos deposited thereon.

The cement-asbestos layer is formed and transferred to the band as best seen with reference to Fig. 5. The exposed surface of the imperforate collecting roll, e. g., the roll 36, carries with it as it turns a thin film 110 of the cement-asbestos slurry. The roll revolves sufficiently fast so that the composition of the slurry in this film is substantially identical with the composition of the slurry in the vat, although this is not essential to operation pursuant to this invention. When the film reaches a position beneath that portion of the foraminous carrier band immediately below the suction box 66, the film will be stripped off the surface of the collector roll by suction and carried across the air gap over to the undersurface of said band to which it will adhere as a layer. The water in the film is sucked through the band, said band because of its fibrous nature acting as a filter to prevent the passage therethrough of any cement or asbestos. It will thus be appreciated that all of the cement-asbestos in the film 110 will be retained in the cement-asbestos layer deposited on the band and that the water which is drained off to waste from the suction pump 70 will be substantially free from cement-asbestos.

The size of the air gap between the collecting roll and undersurface of the band can be varied providing that the gap is never permitted to become so large that the suction is not sufficient to pull over to the band a sufficient amount of the cement-asbestos film. When the band is traveling at a speed of about 140 feet per minute and the collecting roll is turning at a rate corresponding to a linear surface speed about three times as fast, an air gap of $\frac{1}{16}$ of an inch will give satisfactory results. The suction head need be no greater than that obtainable by ordinary commercial suction pumps such as are well known to the art. A head of 8 inches of water is mentioned by way of illustration.

It will be noted that the speed of the collecting roll as just described is greater than that of the band. This is not necessary but permits the layer of cement-asbestos transferred to the band to be of appreciable thickness, and thus increase the delivery of the machine.

Because the collecting roll is imperforate there is some tendency for the film 110 to slide back off the roll into the slurry. This is easily prevented by turning the roll at a sufficient speed. By way of example, the roll will operate satisfactorily with a conventional slurry comprising 600 pounds of sand, 752 pounds of grey Portland cement, 250 pounds of asbestos, 400 pounds of re-ground cement-asbestos board, 100 pounds of lime, and 675 gallons of water if the roll is driven so as to impart thereto a linear speed of 400 feet per minute. Such a high speed, however, is not necessary to prevent slippage of the film and it has been determined that even at linear speeds as small as 20 feet per minute the film 110 still will be raised from the level of the slurry to the top of the roll. It may be mentioned that such slow speeds of the collecting roll ordinarily are not desirable inasmuch as they greatly reduce the productivity of the machine.

Nor is too great a linear speed of the collecting roll desirable. If the collecting roll turns too fast, it either will transfer too thick a layer of cement-asbestos onto the band or it will cause said layer to be lined. Too thick a layer ordinarily is not wanted as it provides fewer laminations in the finished board and reduces its strength. The preferred top speed of the collector roll is 640 feet per minute. Of course the band could be speeded up to accommodate the raised speed of the roll but too great a band speed causes a sharp reduction in the life of the band.

Best results are secured when the linear speed of the surface of the collecting rolls is greater than that of the band for an amount up to about four to one, three to one being a preferred ratio.

Mention also should be made of the fact that when the collecting roll is rougher, mottled or striated, the same is able to operate at still lower rates of speed as there will be less tendency for the cement-asbestos film 110 to slip back into the slurry.

The minimum speed required to raise said film 110 to the top of the roller may be kept low and the thickness of the film retained at a maximum, by keeping the collecting roll almost fully submerged in the slurry. By way of example, it has been found that the process is satisfactorily practiced where a collecting roll of 12″ diameter is so far submerged that it projects only about 2½″ above the level of the slurry in the vat 30.

The tendency of the film to slip also is lessened when the slurry is less watery but, as already pointed out, satisfactory results may be obtained with types of slurry now in use.

It is customary to provide a white coat or lamination on one or both surfaces of a finished cement-asbestos board or of the product, e. g., shingles made from the board, and it is for this purpose that separate vats 30, 32 are used. The slurry in the vat 30 is gray. However, the slurry in the vat 32 is white, the same having the same ingredients as those of the gray slurry except that white Portland cement is employed instead of the gray. Optionally, any suitable coloring material also may be added.

To form a white outer layer on the board the motors associated with the vat 32 are energized and the valve 112 opened to supply a suction head to the suction box over said vat 32. After a proper interval of time, when a sufficient length of white coat has been applied, the motors for the vat 32 are shut off and the valve 112 closed.

The apparatus described above in detail has improved the commercial manufacture of cement-asbestos board in many ways.

Certain of the improvements pertain to plant installation. The instant apparatus has done away with many plant components heretofore thought essential. Thus pursuant to the present invention Savealls are no longer needed. Nor is it required to install piping connecting the molding vats and floor drains to the Savealls. This has resulted in a very large savings in the initial cost of the plant and a large reduction in space. The imperforate roll used in the present invention is considerably smaller than the screen rolls employed in present-day plants and is much more inexpensive to make. This has not only reduced the cost of the roll, but has enabled a smaller and, therefore, less expensive molding vat to be employed. Furthermore, since the roll is imperforate wire washers and wire sprays can be eliminated. It is obvious too that no couch roll need be used and that no sluice bar has to be provided to remove the water heretofore expressed from the carrier band by the couch roll.

Other advantages lie in an improved operation. Principal among these is the saving in raw material which amounts to at least twenty per cent over present-day plants. In addition, by elimination of the couch roll it has been found that the felt lasts considerably longer.

Moreover, the apparatus now is much easier to clean than it has been heretofore. It is customary to close down a plant of the character described once a week for cleaning. Previously such cleaning has consumed a great deal of time, much of which was used in draining out and cleaning the Savealls and the pipes leading thereto, washing the wire roll and chopping off the cement on the floor around the molding vats where the cement-asbestos slurry ran over and hardened. All of this cleaning no longer is necessary. Now the two tanks, the stuff box and the batcher are all that have to be cleaned, and these always had to be cleaned before.

The new apparatus also produces a much better cement-asbestos board. In the old system the Saveall picked up a very large percentage of short fibres because these were the fibres which tended to separate from the slurry and pass through the openings in the wire facing of the molding roll. When such fibres were fed back into the slurry they did not blend properly with the long fresh asbestos fibres. Moreover, the cement led to the Savealls and allowed to stand became inert so that when fed back to the molding vat it was merely a filler equivalent to sand but finer. All of these drawbacks have been avoided by eliminating the Savealls and recirculating the cement-asbestos slurry which overflows from the molding vat. Moreover, the quality of the board heretofore produced has depended on the judgment of the operator who mixed the Saveall material with fresh material. Even with the best judgment the boards were not uniform in strength and hardness. Thus by doing away with the Saveall all the boards have a uniform degree of high strength and hardness. This new apparatus has been found to produce shingles 30 per cent stronger than heretofore produced by old apparatuses from the same material.

It may be mentioned that the ultimate product need not be a flat board, but can be in the shape of a tube. Inasmuch as the final form of the product is no part of the invention, the term "cement-asbestos board," is used throughout the specification and claims, and will be understood to denote a cement-asbestos product consisting of one or more thin sheets, which are laminated when two or more sheets are present.

Certain features of our invention shown and described, but not claimed herein, are shown, described and claimed in our copending application Serial No. 674,808, filed June 6, 1946, for Cement-Asbestos Board, now United States Letters Patent No. 2,500,923, dated March 21, 1950, of which the present application is a division.

It thus will be seen that there is provided an apparatus for manufacturing cement-asbestos board which achieves the several objects of the invention, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described the invention, we claim as new and desire to secure by Letters Patent:

1. In an apparatus for manufacturing cement-asbestos board, the combination of, a molding vat adapted to contain cement-asbestos slurry, an imperforate uncovered collector roll mounted to rotate about a horizontal axis in said vat with a portion of its surface above the level of the slurry in the vat, means to rotate said roll so as to carry an exposed film of slurry up on the uncovered surface thereof to the top of the roll, a pervious fibrous carrier band, a plurality of guide members for holding said band above the roll in proximity thereto and out of contact with the exposed film of slurry, means to move said band past the roll, and a suction device on the upper surface of said band above said roll to transfer from the collector roll to the undersurface of the band the exposed film of slurry on the uncovered surface of the collector roll.

2. An apparatus as set forth in claim 1 wherein there are provided a plurality of parallel collector rolls mounted to rotate in the vat with the upper surfaces thereof in a common horizontal plane, each said roll having associated therewith a suction device.

3. An apparatus as set forth in claim 1 wherein means is provided to vary the speed of rotation of the roll.

4. In an apparatus for manufacturing cement-asbestos board, the combination of, a molding vat adapted to contain cement-asbestos slurry, means including a conduit to feed slurry to said vat, means including a conduit to deliver from said vat slurry above a predetermined normal level, an imperforate uncovered collector roll mounted to rotate about a horizontal axis in said vat with a portion of its surface above the normal level of the slurry in the vat, means to rotate said roll so as to carry an exposed film of slurry up on the uncovered surface thereof to the top of the roll, a pervious fibrous carrier band, a plurality of guide members for holding said band above the roll in proximity thereto and out of contact with the exposed film of slurry, means to move said band past the roll, and a suction device on the upper surface of said band above said roll to transfer from the collector roll to the undersurface of the band the exposed film of slurry on the uncovered surface of the collector roll.

5. In an apparatus for manufacturing cement-asbestos board, the combination of, a molding vat adapted to contain cement-asbestos slurry, a receptacle for containing cement asbestos slurry, means including a conduit to feed slurry from said receptacle to said vat, means including a conduit to feed directly back to said receptacle the slurry in the vat above a predetermined normal level, an imperforate uncovered collector roll mounted to rotate about a horizontal axis in said vat with a portion of its surface above the normal level of the slurry in the vat, means to rotate said roll so as to carry an exposed film of slurry up on the uncovered surface thereof to the top of the roll, a pervious fibrous carrier band, a plurality of guide members for holding said band above the roll in proximity thereto and out of contact with the exposed film of slurry, means to move said band past the roll, and a suction device on the upper surface of said band above said roll to transfer from the collector roll to the undersurface of the band the exposed film of slurry on the uncovered surface of the collector roll.

WILLIAM BERNARD.
JOSEPH BERNARD.

References Cited in the file of this patent

UNITED STATES PATENTS

| Number | Name | Date |
| --- | --- | --- |
| 440,750 | Shinn | Nov. 18, 1890 |
| 829,677 | Sillman | Aug. 28, 1906 |
| 840,387 | Sillman | Jan. 1, 1907 |
| 917,030 | Erler | Apr. 6, 1909 |
| 1,859,986 | Saunders | May 24, 1932 |
| 1,879,797 | Ellis | Sept. 27, 1932 |
| 2,171,155 | Wright | Aug. 29, 1939 |
| 2,411,416 | Dieckbrader | Nov. 19, 1946 |